United States Patent
Kamijo et al.

(10) Patent No.: US 7,215,319 B2
(45) Date of Patent: May 8, 2007

(54) WRISTWATCH TYPE DEVICE AND METHOD FOR MOVING POINTER

(75) Inventors: Noboru Kamijo, Fujisawa (JP); Tadanobu Inoue, Sagamihara (JP); Kohichiro Kishimoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 09/682,024

(22) Filed: Jul. 11, 2001

(65) Prior Publication Data

US 2002/0027547 A1    Mar. 7, 2002

(30) Foreign Application Priority Data

Jul. 11, 2000    (JP)    ............... 2000-210598

(51) Int. Cl.
   *G09G 5/00*    (2006.01)
(52) U.S. Cl. .................. 345/156; 345/173; 368/30; 368/83
(58) Field of Classification Search ............... 345/156, 345/157, 158, 159, 173, 179, 168, 169, 163; 368/30, 83, 84, 241, 242
   See application file for complete search history.

(56) References Cited

U.S. PATENT DOCUMENTS

| | | | |
|---|---|---|---|
| 4,988,981 A | * | 1/1991 | Zimmerman et al. ....... 345/158 |
| 5,050,116 A | * | 9/1991 | Stahnke ...................... 708/145 |
| 5,295,204 A | * | 3/1994 | Parulski ...................... 382/167 |
| 5,502,568 A | * | 3/1996 | Ogawa et al. .............. 356/620 |
| 5,661,506 A | * | 8/1997 | Lazzouni et al. ........... 345/179 |
| 6,111,580 A | * | 8/2000 | Kazama et al. ............. 345/863 |
| 6,137,479 A | * | 10/2000 | Olsen et al. ................. 345/169 |
| 6,304,820 B1 | * | 10/2001 | Goto et al. .................. 701/209 |
| 6,369,794 B1 | * | 4/2002 | Sakurai et al. .............. 345/156 |
| 6,369,803 B2 | * | 4/2002 | Brisebois et al. ........... 345/173 |
| 6,765,553 B1 | * | 7/2004 | Odamura ..................... 345/156 |

FOREIGN PATENT DOCUMENTS

| | | |
|---|---|---|
| JP | 07-281829 | 10/1995 |
| JP | 07-302158 | 11/1995 |
| JP | 10-124681 | 5/1998 |
| JP | 10-177449 | 6/1998 |
| JP | 11-095910 | 4/1999 |
| JP | 11-119867 | 4/1999 |
| JP | 11-298362 | 10/1999 |
| JP | 2000-181619 | 6/2000 |

* cited by examiner

*Primary Examiner*—Richard Hjerpe
*Assistant Examiner*—Jean Lesperance
(74) *Attorney, Agent, or Firm*—Ido Tuchman; E. Dwayne Nelson

(57) ABSTRACT

A feature of the present invention includes a device having a display controller for controlling a display position of the pointer on the display screen, a displacement detector for detecting a displacement of the device itself, and a pointer mover for moving the pointer on the display screen based on the detected displacement of the device itself.

4 Claims, 11 Drawing Sheets

WRISTWATCH TYPE DEVICE AND METHOD FOR MOVING POINTER

BACKGROUND OF INVENTION

1. Field of the Invention

The present invention relates to a device suitable for use with a portable information input device. More particularly, to a wristwatch type device and a method for moving a pointer.

2. Background Art

As is well known in the art, owing to recent miniaturization of information apparatuses, so-called palm-sized (palm-top type) information apparatuses have appeared as well as wristwatch type information apparatuses.

These information apparatuses do not provide for a keyboard for their miniaturization, instead some of them provide for a pointing device in the form of button, ball, lever, etc., which are operable in two, four or all directions for performing various operations, such as moving a pointer or a cursor on a display screen, scrolling a screen, and inputting characters. Alternatively, instead of these pointing devices, some of information apparatuses provide for a so-called touch panel, which is operated by touching the display screen.

However, when above-mentioned information apparatuses are provided with a pointing device, there is needed at least an operative member such as a button, ball and lever; a mechanism for moving this operative member; and a mechanism for detecting an operation of the operative member, all of which not only prohibit miniaturization and water proofing property, but also influence and restrain the design for an accessory, especially in the case of wristwatch type information apparatuses.

Assuming that the display itself of the device is of a touch panel type, an information apparatus with a certain degree of size is operable by touching with a touch pen or a finger, however, for a wristwatch type information apparatus, in particular, it is unrealistic to always carry a touch pen with a watch, thus it is to be touched by a finger. However, a wristwatch type information apparatus is hard to operate due to its small display screen (touch panel), which results in a big problem in operability, such as a portion that is touched by a finger is hard to see. Also, when providing for a touch panel on the display screen, not only does the transmittance of a display screen degrades, but also a fingerprint and stain are likely to be attached, which can further degrade the visibility.

In addition, for these small information apparatuses, there is always a need to restrain power consumption to extend the usable time.

The present invention solves the technical problems of the prior art. Therefore, an object of the present invention is to provide a device that does not prohibit miniaturization and that allows for the adding of water proofing properties.

Another object of the present invention is to provide a device that restrain power consumption to extend the usable time.

SUMMARY OF INVENTION

A feature of the present invention includes a device having a display controller for controlling a display position of the pointer on the display screen, a displacement detector for detecting a displacement of the device itself, and a pointer mover for moving the pointer on the display screen based on the detected displacement of the device itself.

In another aspect of the present invention, a wristwatch type device of the present invention comprises a touch sensor mounted in a case or an attached belt for performing a predetermined operation on an object displayed on the screen.

In a further aspect of the present invention, a method for controlling a device comprises a first step of taking an image of a physical object facing the device continuously and detecting a relative displacement between the taken object and a display. The method includes a second step for changing a display position of a pointer displayed on the display based on the detected displacement.

In a still further aspect of the present invention, there is provided a method for moving a pointer displayed in a display of a device. The method comprises the steps of: detecting a displacement of the device when moving the device; and changing a display position of the pointer displayed in the display based on the detected displacement.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIGS. 1A and 1B show the illustration of a wristwatch type device according to the present invention, wherein FIG. 1A is the elevation view and FIG. 1B shows how to operate the wristwatch type device attached to the wrist.

FIGS. 8A and 8B are diagrams showing how to operate a wristwatch type device, wherein FIG. 8A shows moving the device upward and FIG. 8B shows moving the device downward subsequently.

DETAILED DESCRIPTION

Figure 1A:
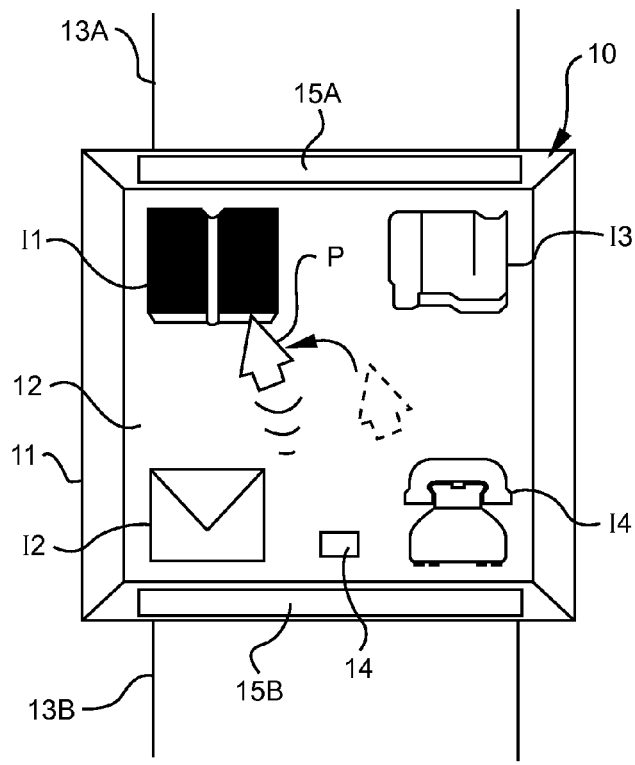

For the present invention, when moving the device itself equipped with the display screen, a displacement of the device is detected, thereby moving the pointer on the display screen. In this way, it becomes possible to operate a device, without using a mechanical pointing device or a touch panel type display screen as before.

The displacement detector may comprise an image sensor, wherein an image sensed by the image sensor is processed to obtain a displacement of the device itself. The image sensor preferably includes a complementary metal-oxide semiconductor (so-called CMOS), a charge coupled device (so-called CCD), or an infrared sensor.

The device may further comprise an operator activating the image sensor, wherein the image sensor is turned off while not operating the pointer, thereby restraining the power consumption. Furthermore, the operator may comprise a function for directing a selection of an object pointed by the pointer or an execution of predetermined processing defined for the object, whereby the operator have a plurality of functions, thereby keeping the number of operator to a minimum.

In this way, providing for a touch sensor around a display in a wristwatch type device with a small display, an operation can be performed without touching the display, thereby being superior in operability. Moreover, a device can be miniaturized by employing not a mechanical pointing device but a touch sensor.

Further, providing for touch sensors on both sides of the display, the hold characteristic of the device during operation increases.

The wristwatch type device may further comprise displacement detector for detecting a displacement of the display; and pointer position changing means for changing a display position of a pointer based on the detected results, thereby moving the pointer displayed on the screen.

A first step according to the present invention further comprises the steps of: calculating a motion vector at a certain place in an image that was taken multiple times; and obtaining a relative displacement between the object and the display based on the calculated motion vector. A motion vector in a certain place is calculated based on a position of the certain place in a principal image (e.g., the first image) and a position of a place corresponding to the certain place in another image (e.g., the second image) that was taken apart in time from the principal image. That is, it is obtained where an image at a certain place in the first image moved in the second image.

In this case, when moving the device relative to the object, the relative displacement between the object and the display is obtained by inverting a sign of the motion vector.

Alternatively, the first step may comprise the steps of: generating a time-series moving pattern of a certain place based on a position of the certain place in a principal image and a position of a place corresponding to the certain place in a plurality of other images; and comparing the generated time-series moving pattern with a plurality of model patterns to select a most approximate model pattern. The second step may comprise the step of changing a display position of the pointer based on a moving pattern that was defined for the selected model pattern.

The method may further comprise the steps of starting to detect a displacement of the device when a predetermined startup operation is performed by a user. With this configuration, when not detecting a displacement of the device, a sensor for sensing a displacement is kept off-state, thereby restraining power consumption.

Now the present invention will be described based on three embodiments shown in the attached drawings.

Figure 1B:
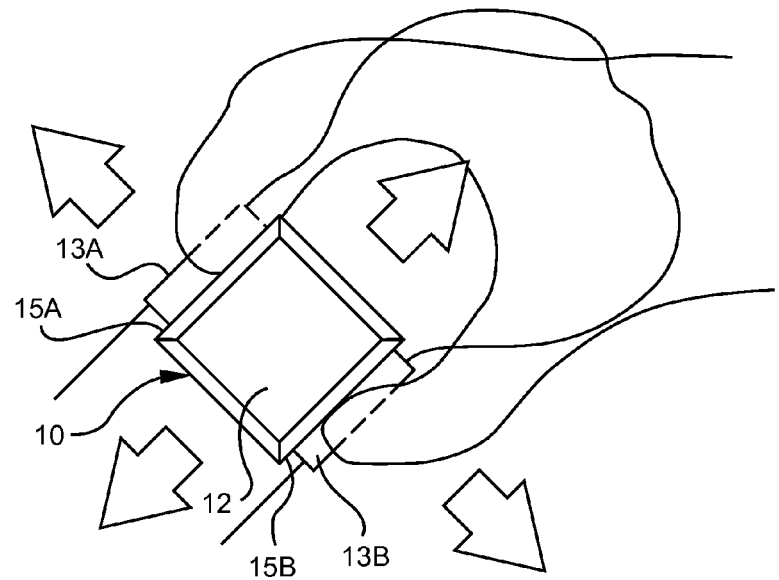

FIG. 1 is a diagram for illustrating a wristwatch type device according to the present invention. In FIG. 1, a symbol 10 is a wristwatch type device, 11 is a case supporting the body of the wristwatch type device 10, 12 is a display comprising a display screen that is composed of an LCD panel, for example, provided on the front side of the case 11, and 13A and 13B are an attached belt of a wristwatch type device.

As shown in FIG. 1(a), there is provided an image sensor 14 in a part of the display 12, which serves as a displacement detection means or a displacement detecting section. The image sensor 14 takes an image that faces the display 12 on the display side, in other words, an image when viewing outside (of the wristwatch type device 10) from the display side 12. That is, such as a user's face is taken as an imaging object when he or she looks inside the display 12 with facing the wristwatch type device 10.

The image sensor 14 is preferably a CMOS or CCD. In the embodiment of the present invention, a CMOS of 36×36 dots or so is employed as an image sensor 14 for the reason that the required minimum resolution is assured and power consumption is low.

On the front side of the case 11, there are provided, as the operative means, a pair of two touch sensors 15A and 15B around the display 12, for example upper side and lower side.

Figure 2:
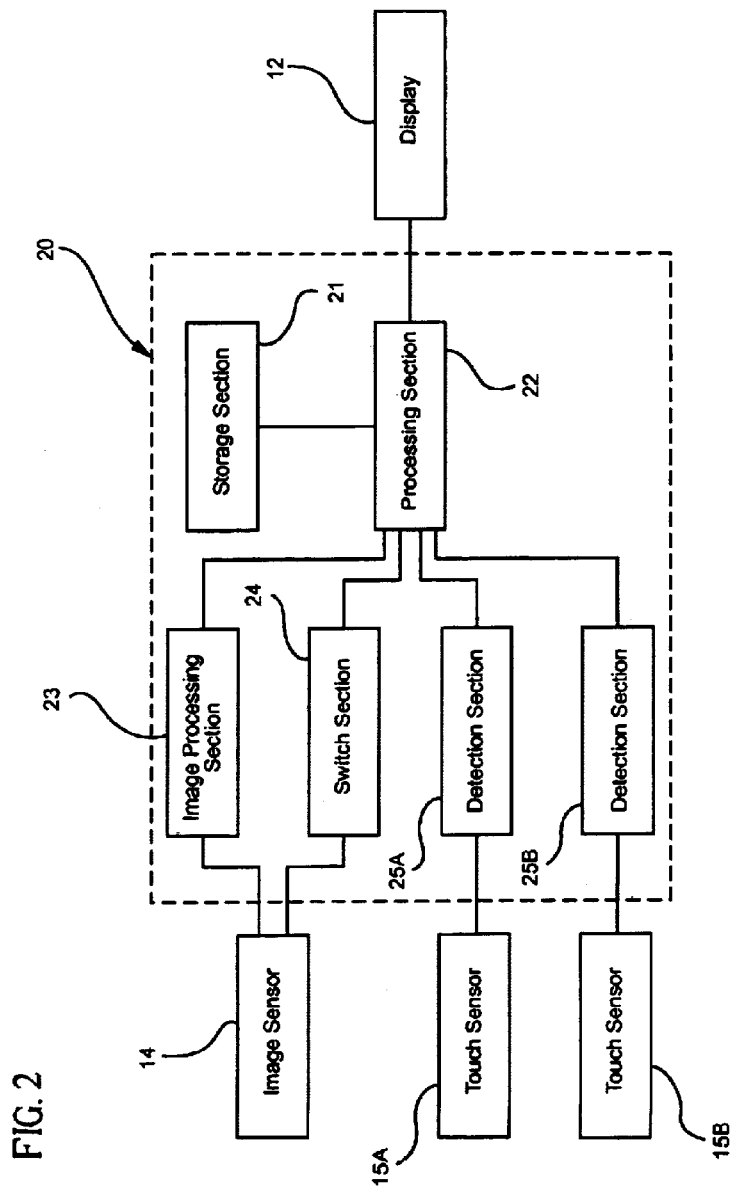
FIG. 2 shows a schematic of the wristwatch type device.

As shown in FIG. 2, there is provided a control section (display control means) 20 inside the case 11 for controlling the contents displayed in the display 12. The control section 20 comprises a storage section 21 for storing predetermined programs, a processing section (pointer moving device, pointer position changing device) 22 for processing the contents displayed in the display 12 based on the programs stored in the storage section 21, an image processing section 23 for performing predetermined processing based on images that are taken by the image sensor 14, a switch section 24 for turning the image sensor 14 on-state, and a detection section 25A and 25B for detecting a user touching the touch sensor 15A and 15B.

The processing section 22 issues a command to activate the image sensor 14 using the switch section 24 when detecting either the touch sensor 15A or 15B is being touched in the detection section 25A or 25B. Further, the processing section 22 causes the image processing section 23 to perform predetermined image processing on an image taken by the image sensor 14, when detecting both touch sensors 15A and 15B are being touched in the detection sections 25A and 25B while the image sensor 14 is on-state. Then, the movement of the pointer P shown in FIG. 1 is processed based on the results, thereby changing the display position of the pointer P on the display screen of the display 12. In addition, as shown in FIG. 1, when detecting either the touch sensor 15A or 15B is tapped while the pointer P indicates any icon (11 to 14) on the display screen, the processing section 22 determines the click operation has occurred and performs predetermined processing based on the programs stored in the storage section 21.

As shown in FIG. 1 (b), such a wristwatch type device 10 is attached to the wrist of a user by the attached belt 13A and 13B. In the display 12 of the wristwatch type device 10, predetermined display contents are displayed based on the programs stored in the storage section 21. As with personal computers and various portable information terminals, icons and menus are displayed in the display screen of the display 12.

In the present embodiment, as shown in FIG. 1(a) for example, a plurality of icons 11 to 14 are displayed as an object for the initial screen in the display screen of the display 12. Also, the pointer P is displayed in the display 12 for performing an operation.

For a wristwatch type device 10, just like a pointer is operated by mouse in a typical personal computer, a pointer P is moved in the display screen of the display 12 to perform various operations. For example, indicating any icon (e.g., 11) with a pointer P and performing a predetermined operation (e.g., double-click) in this condition, predetermined processing is performed which is defined for an icon 11.

For the wristwatch type device 10 according to the present embodiment, a pointer P is moved within the display screen of the display 12 by simply moving the wristwatch type device 10, without the need for a pointing device such as a button, ball, lever, and let alone a mouse and touch panel. When wearing a wristwatch type device 10 on the wrist, one may simply move his or her arm.

Usually, there is some allowance for an attached belt when wearing a wristwatch type device on a wrist, thus it is possible to move only a watch on an arm (wrist) without moving an arm. Therefore, as shown in FIG. 1 (*b*), according to the present embodiment, it is good enough to grasp this wristwatch type device 10 with an opposite hand to the one wearing this device and move it on his arm in the direction shown by the arrow in the drawing.

Figure 3:
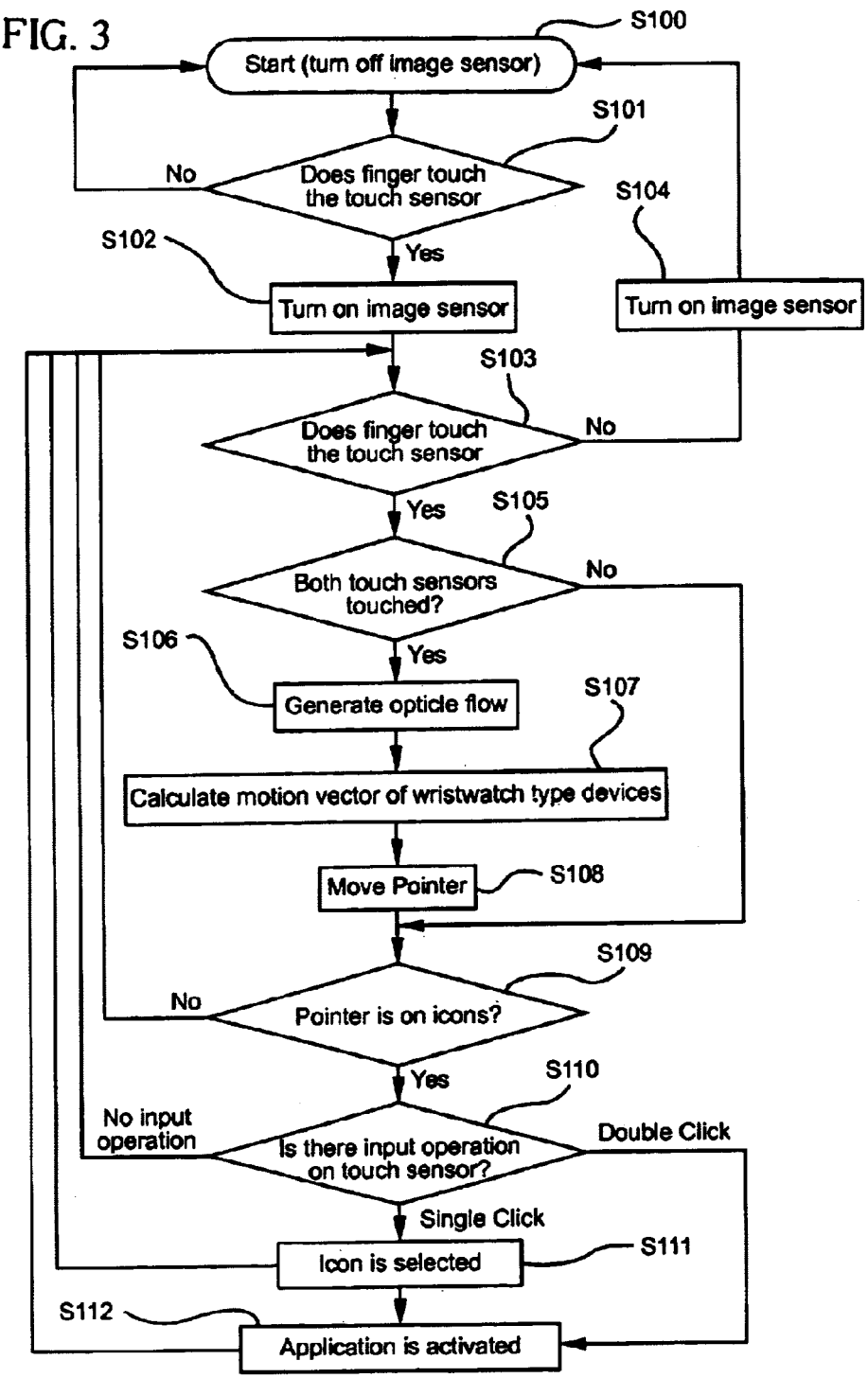
FIG. 3 is a flowchart of a process for moving a pointer in a first embodiment of the present invention.

At this time, a displacement of the wristwatch type device 10 is detected based on a motion vector of an imaging object (e.g., a head of a user who is looking inside the display 12) within an imaging range of the image sensor 14 mounted in the display 12, then the pointer displayed in the display 12 is moved based on this displacement. Now the detailed flow will be described in reference to a flowchart of FIG. 3.

As for the processing in the wristwatch type device 10, while the image sensor 14 is off-state (step S100), the detection section 25A or 25B detects that a user touches either the touch sensor 15A or 15B with his finger or the like according to a predetermined startup operation (step S101), then the image sensor 14 is turned on (step S102).

After the image sensor 14 was turned on, the detection sections 25A and 25B detect whether the touch sensor 15A or 15B is touched within a predetermined time (measured by a timer) (step S103). If not, the image sensor 14 is turned off and returns to the wait condition (step 104).

If detecting that the touch sensor 15A or 15B is touched within the predetermined time, it is detected whether both touch sensors are touched. If both of them are not touched at the same time, the after-mentioned step (S109) is continued (step S105).

If detecting that both touch sensors 15A and 15B are touched, an optical flow is generated in the image processing section 23 based on the image taken by the image sensor 14 (step S106).

Figure 4:
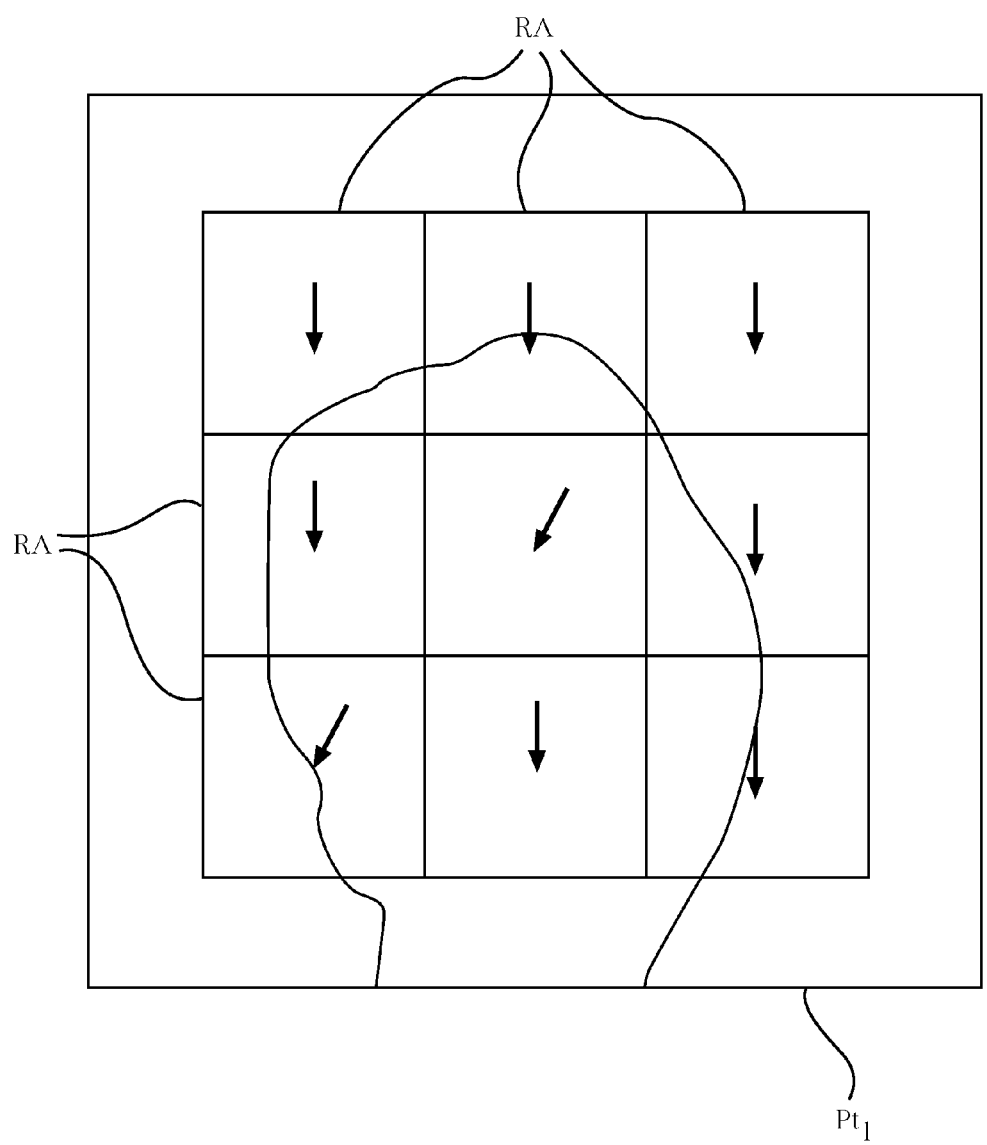
FIG. 4 shows an image taken in by the image sensor.

In order to generate the optical flow, the image processing section 23 takes in an image taken by the image sensor 14 every predetermined time (e.g., 32 msec). As shown in FIG. 4, a plurality of reference image areas (RA) are set in the taken image (3×3=9, in the example shown in FIG. 4), wherein the motion vector (an arrow shown in FIG. 4) is calculated for each reference image area RA between its corresponding image at a predetermined time later.

Figure 5:
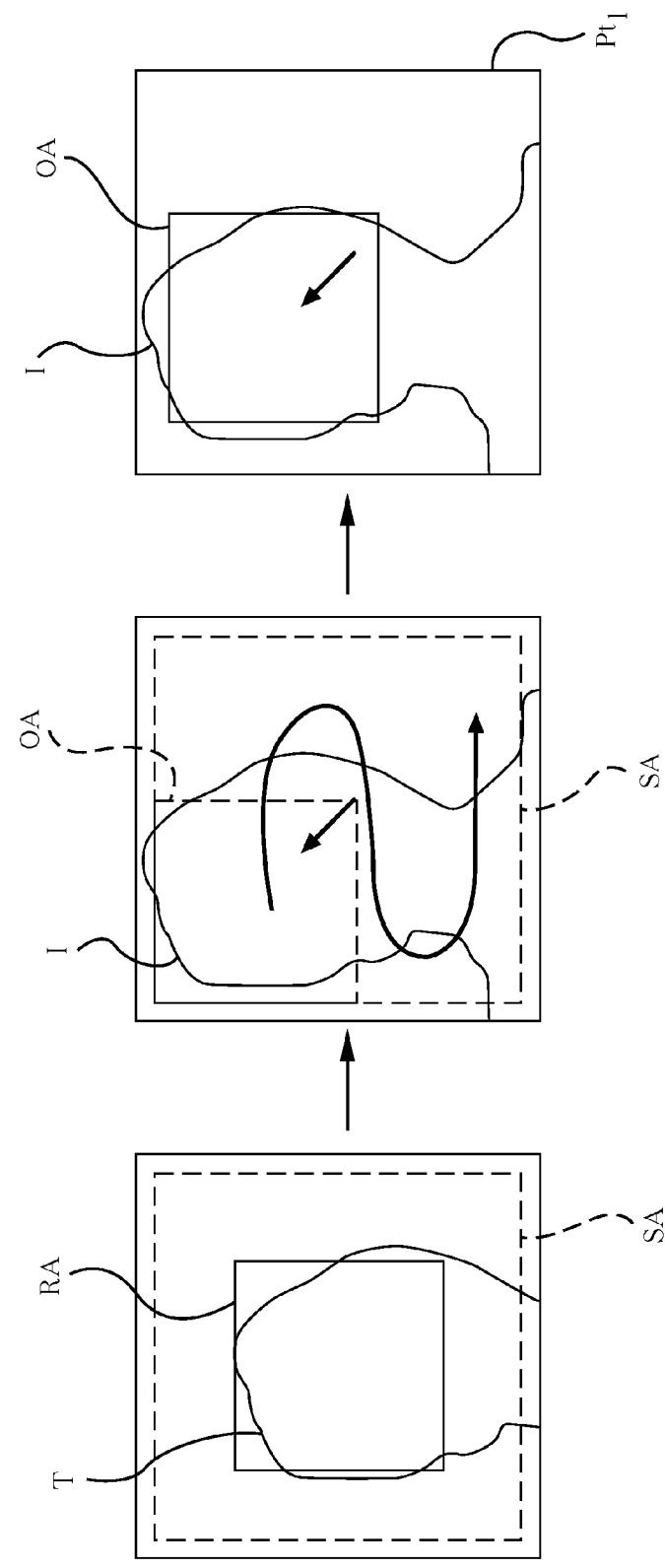
FIG. 5 shows a flow of the image processing of the image taken in by the image sensor, wherein (a) shows a reference image area and a search area for the first image; (b) shows how to scan the object image area within the search area for the second image; (c) shows a position of the object image area corresponding to the reference image area.

FIG. 5 is a diagram for illustrating how to calculate a motion vector for each reference image area RA, wherein a single reference image area RA is set for an image for simplifying the explanation.

As shown in FIG. 5(*a*), a reference image area RA is set at a predetermined position for a principal image $Pt_0$ that was taken at time $t_0$, then a search area SA, which is greater than the reference image area RA, is set for this reference image area RA. This search area SA is set for the display screen of the display 12, that is so to speak fixed. Then, for an image $Pt_1$ taken at time $t_1$ after a predetermined time passed, an object image area OA, which has the same size as the reference image area RA, is scanned in the search area SA as shown by an arrow in FIG. 5(*b*), and then a position is searched which has a minimum difference from the reference image T in the reference image area RA of the principal image $Pt_0$. At this point, the following equation is used for obtaining a difference between the reference image T in the reference image area RA of the principal image $Pt_0$ and the object image I in the object image area OA of the image $Pt_1$.

$$R = \sum_{i=1}^{M} \sum_{j=1}^{N} |I(i, j) - T(i, j)| \qquad \text{Equation 1}$$

In the above equation 1, i is a position of a pixel in X direction (e.g., horizontal direction in the drawing) in the object image I and reference image T, j is a position of a pixel in Y direction (e.g., vertical direction in the drawing) in the object image I and reference image T, M is the number of pixels in X direction in the object image area OA and reference image area RA, and N is the number of pixels in Y direction in the object image area OA and reference image area RA.

As shown in FIG. 5(*c*), when scanning the object image area OA in the search area SA for the image $Pt_1$, an object image I corresponding to a position that has a minimum residual R calculated by equation 1 is a position corresponding to the reference image T of the principal image $Pt_0$, where the reference image T is to move. Hereby, the motion vector (an arrow shown in FIG. 5(*c*)) of the reference image T during a predetermined time ($t_1$ to $t_0$) is obtained.

In the same manner as described above, each motion vector (see an arrow in FIG. 4) is obtained for each reference image area RA shown in FIG. 4. A search area SA is set individually for each reference image area RA.

A distribution of motion vectors in a plurality of reference image areas RA is the optical flow obtained in step S106.

In next step S107, an average of each motion vector in the optical flow is calculated. Since this average is a motion vector of an image taken by the image sensor 14 for a predetermined time ($t_1$ to $t_0$), then a sign (plus, minus) of this motion vector is inverted, which becomes the motion vector of the wristwatch type device 10.

Then, multiplying the obtained motion vector by a predetermined coefficient to transform it to the motion vector of the pointer P in the display screen, a display position of the pointer P in the display screen is moved based on this motion vector (step S108).

Next, it is determined whether the moved pointer P overlaps with any icon 11 to 14 (step S109). If not, the process goes back to step S103 to continue the processing for moving the pointer P, while if the pointer P overlaps with any icon, the process waits for an operation on either the touch sensor 15A or 15B for a predetermined time (step S110). It is detected how many times the touch sensor 15A or 15B have been touched in the predetermined time, then depending on the result, if the detected times are zero, the process goes back to step S103, if the detected times are one, it is determined to be a single click operation, wherein an icon that overlaps with the pointer P (e.g., 11) is selected (step S111). If the detected times are two, it is determined to be a double click operation, wherein a predetermined operation, for example, an activation of a related application, which is defined for an icon (e.g., 11) that overlaps with the pointer P is performed (step S112). After that, in step S103, the process waits for a touch on the touch sensor 15A or 15B, as a result, if no touch occurs for a predetermined time, the image sensor 14 is turned off in step S104.

In this way, moving the wristwatch type device 10 itself, the moving operation of the pointer P on the display screen of the display 12 is performed. This dispenses with a mechanical pointing device such as a conventional button type one, which enables improvement of miniaturization and water proofing property of the wristwatch type device 10 and further enhances flexibility of design. Moreover, one does not need to touch the display 12 like a touch panel, so it excels in operability and also can avoid the display smearing.

In addition, as the touch sensor 15A and 15B functions as a switch for the image sensor 14, as long as one does not touch the touch sensor 15A and 15B, the image sensor 14 does not operate, which restrains power consumption and extends a consecutive usable time. Moreover, the touch sensor 15A and 15B are not mounted in the display 12 but around its periphery, which prevents the display 12 smearing.

Furthermore, while both the touch sensors 15A and 15B are touched, the detection of movement is performed in the image sensor 14. Thus, if one touches the touch sensors 15A and 15B, which are disposed on both the top and bottom sides of the display 12, with a thumb and forefinger, the case 11 of the wristwatch type device 10 is held stable, thus its movement is performed easily and reliably.

Figure 6:
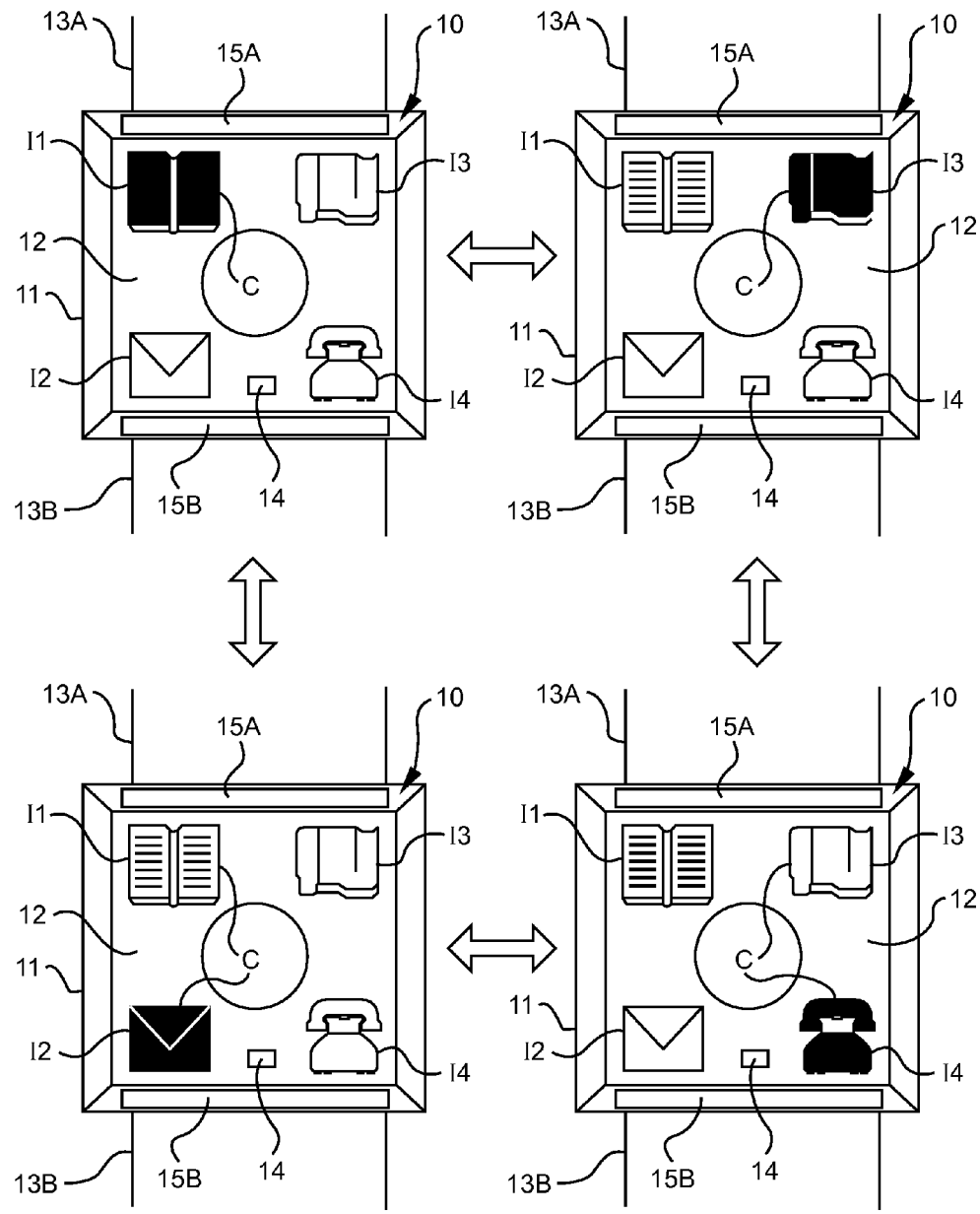
FIG. 6 shows how a cursor moves in the second embodiment of the present invention.

Next, a second embodiment of the present invention will be described for a device, a wristwatch type device, a method for controlling the device, and a method for moving a pointer. While in the above first embodiment, a pointer P is moved to any position on the display screen of the display 12 by moving the wristwatch type device 10, in the second embodiment described below, movement of a cursor is determined based on a moving pattern of the wristwatch type device. In the following description, common components with the above first embodiments are shown by the same reference numbers and are omitted about their explanation. As shown in FIG. 6, a wristwatch type device 10' according to this embodiment is completely the same as the wristwatch type device 10 described in the first embodiment in terms of device configuration, wherein only the difference is the processing in the control section 20 shown in FIG. 2, that is, the programs stored in the storage section 21.

As shown in FIG. 6, for this wristwatch type device 10', icons 11 to 14 are displayed in the display screen of the display 12 as an initial screen. In this condition, a cursor C as a pointer is displayed by inverting any one of icons 11 to 14 (e.g., icon 11) between black and white.

Figure 7:
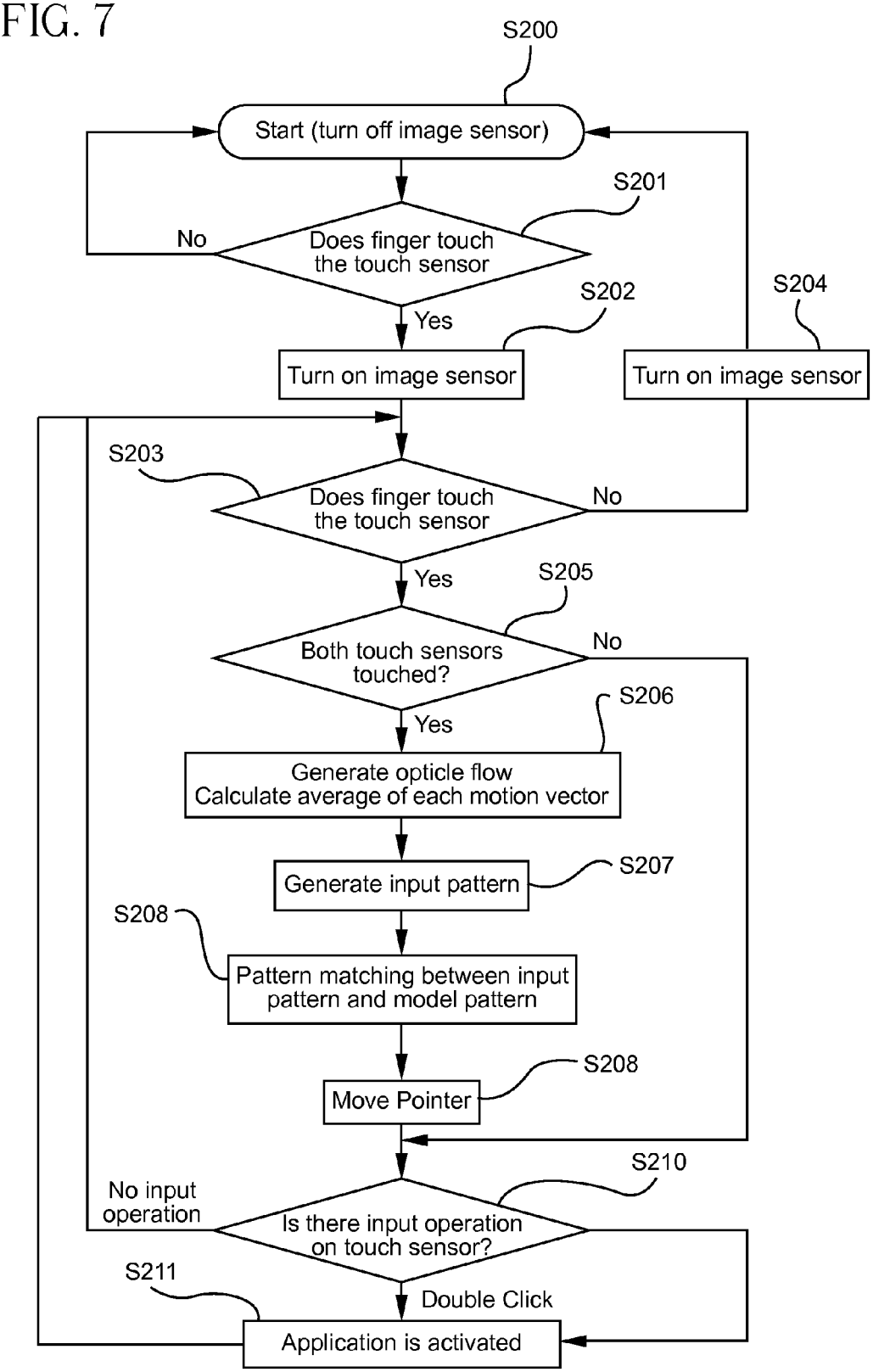
FIG. 7 is a flowchart of a process for moving a cursor in the second embodiment of the present invention.

As shown in the flowchart of FIG. 7, for the wristwatch type device 10', the image sensor 14 is off-state in the initial condition (step S200). When the detection section 25A or 25B detects that a user touches either the touch sensor 15A or 15B with a finger or the like (step S201), then the image sensor 14 is turned on (step S202).

After the image sensor 14 was turned on, if the touch sensor 15A or 15B is not touched within a predetermined time (step S203), the image sensor 14 is turned off and returns to the initial condition (step 204). If the touch sensor 15A or 15B is touched within the predetermined time, it is detected whether both touch sensors 15A and 15B are touched (step S205). If both of them are not touched at the same time, the after-mentioned step (S210) is continued.

If detecting that both touch sensors 15A and 15B are touched, just like the first embodiment, an optical flow is generated in the image processing section 23 based on the image taken by the image sensor 14, and further an average of each motion vector of the optical flow is calculated (step S206). Note that the optical flow is generated within a predetermined time (e.g., 160 msec) in time-series from an image taken by the image sensor 14 every predetermined time (e.g., 32 msec).

Next in step S207, an input pattern of the wristwatch type device 10' is generated from the average of the above-mentioned motion vector.

Figure 8A:
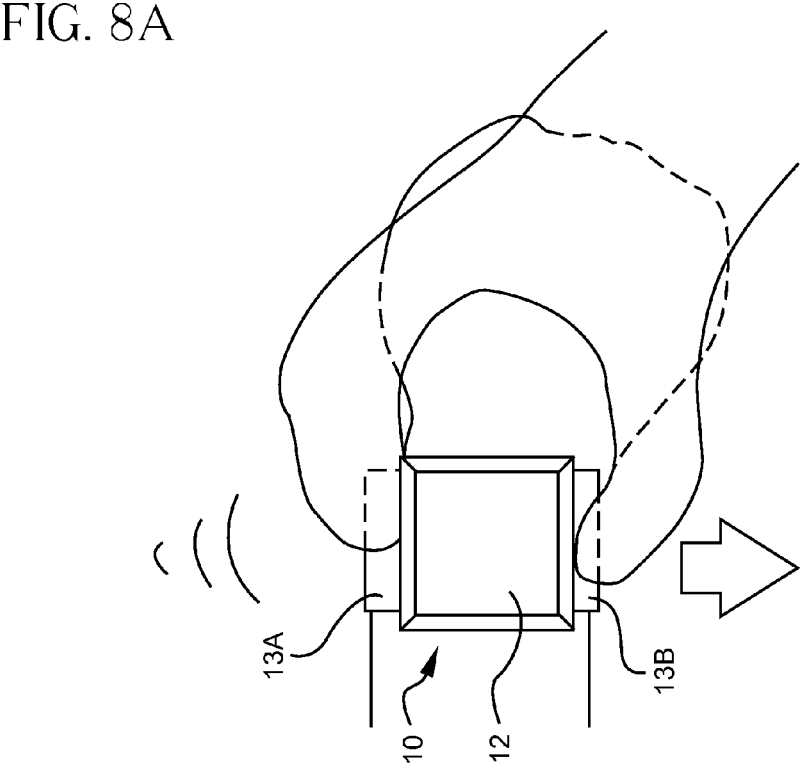
Figure 8B:
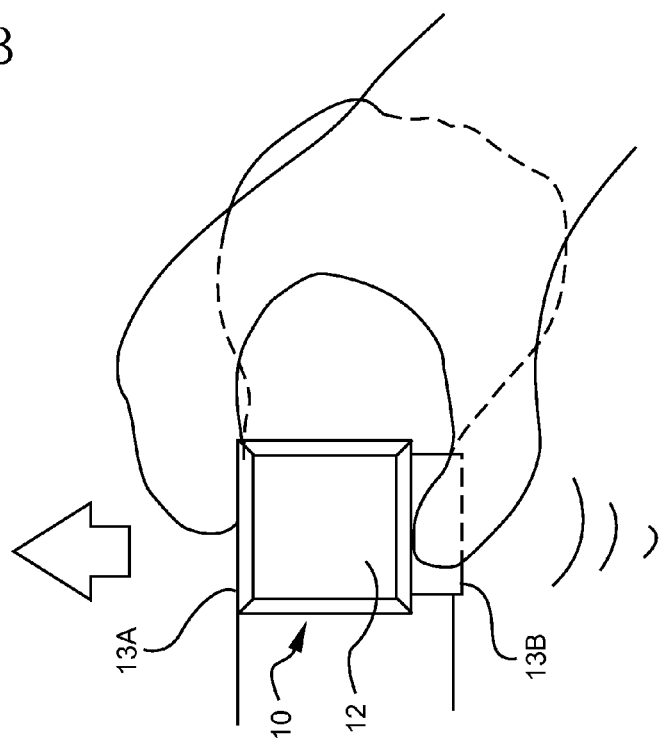

Assuming that the wristwatch type device 10' is moved upward first, then downward within a predetermined time in step S206, as shown in FIG. 8(a) and FIG. 8 (b).

Figure 9:
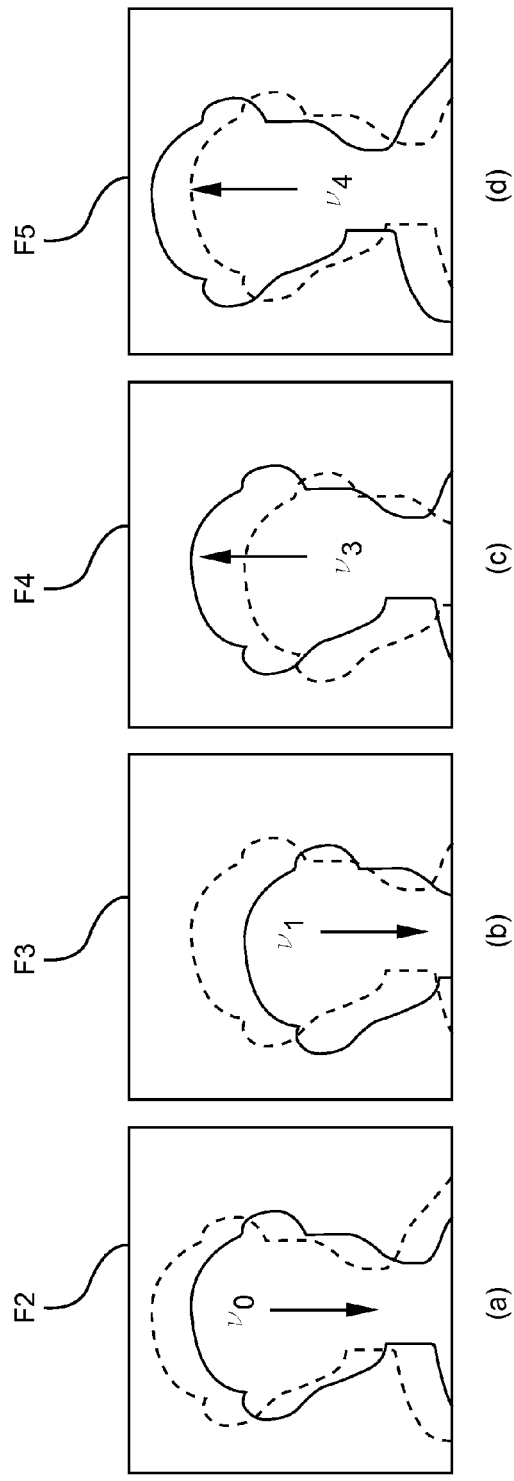
FIGS. 9A through 9D show moving patterns arranged in time-series from (a) to (d) that are taken in by moving the wristwatch type device as shown in FIG. 8.

The average of the motion vector of the optical flow obtained for the predetermined time in step S206 is shown in FIGS. 9(a) to (d). FIG. 9 shows images that are taken in by the image sensor 14 every predetermined time (32 msec), which are arranged in time-series from (a) to (d). FIG. 9(a) is an image $F_2$ that was taken in by the image sensor 14 for the second time, (b) is an image $F_3$ taken in for the third time, (c) is an image $F_4$ taken in for the fourth time, (d) is an image $F_5$ taken in for the fifth time. In each drawing, a dotted line shows a position of an image that was taken in the last time, wherein the difference from that position is to be an average of the motion vector $V_0, V_1, V_2$ and $V_3$. For example, for an image $F_2$, a position shown by the dotted line corresponds to a position of a principal image that was taken in for the first time, wherein the difference from a position of an image shown by a solid line becomes an average of the motion vector $V_0$.

In this way, a time-series moving pattern A that is a series of data of averages of motion vectors $V_0, V_1, V_2$ and $V_3$ is represented as follows.

$$A=(V_0, V_1, V_2, V_3)$$

On the other hand, a plurality of model patterns are stored in advance in the storage section 21. This model pattern is data that models the assumable movement of the wristwatch type device 10' when operating the cursor C. Each pattern is defined as a moving pattern either with cursor movement in a predetermined direction (e.g., total of four directions including up, down, left and right) or without cursor movement. FIG. 6 depicts how the cursor C displayed in the display 12 moves in total of four directions between icons 11 to 14. For example, if the cursor C is a moving pattern that moves to the right, the cursor C moves from the icon 11 shown in the upper left of FIG. 6 to the icon 13 shown in the upper right.

A plurality of model patterns registered like this are matched with the time-series moving pattern (input pattern) A obtained in step S207, thereby recognizing a model pattern that most approximates to the pattern A among a plurality of model patterns.

Next in step S209, according to a moving pattern defined for the recognized model pattern, the cursor C in the display 12 is moved (if approximating to the model pattern without cursor movement, the cursor C does not move). For example, in an example of the time-series moving pattern A shown in FIG. 9, the pattern A is recognized to approximate to a model pattern when moving the cursor C upward, thus the cursor C is moved upward according to the moving pattern (i.e., upward movement) defined for this model pattern. In this way, based on the time-series moving pattern A when moving the wristwatch type device 10', the cursor C is moved to the left, right, upward and downward, as shown in FIG. 6.

After the cursor C is moved like this (sometimes it does not move), in step S210, it is detected how many times the touch sensor 15A or 15B have been touched in the predetermined time. If the detected times are zero, the process goes back to step S203, if detected times are two, it is determined to be a double click operation, wherein a predetermined operation, for example, an activation of a related application that is defined for an icon (e.g., 11) that overlaps with the cursor C is performed (step S211).

As mentioned above, for the wristwatch type device 10', the cursor C is moved on the display screen of the display 12 by moving the wristwatch type device 10' itself, as with the above-mentioned first embodiment. This enhances flexibility of design as well as brings about the same effects as the first embodiment, including miniaturization of the wristwatch type device 10', improvement of water proofing property and operability, and stain proofing property of the display 12.

By the way, in the first embodiment, the pointer P might be displayed in a different position than icons 11 to 14, whereas in the second embodiment, the cursor C moves between icons 11 to 14 (sometimes does not move) to always indicate any one, thus the cursor C is easily operated to move.

It is noted that in the above second embodiment, the moving pattern for the cursor C includes total of four directions including up, down, left and right, however, it should not be limited to this. For example, an oblique direction may be added or only upward and downward directions or only right and left directions may be considered depending on a display of icons or an operation menu in the display 12. For a matching technique for matching a time-series moving pattern A with a model pattern or a generation technique for generating a time-series moving pattern A, any technique may be employed as long as a required object is achieved that a moving direction of a cursor C be defined as a predetermined direction when moving a wristwatch type device 10'. Further, a cursor C is moved in the above second embodiment, however, a pointer P may be moved by a similar technique.

In the above first and second embodiments, an image sensor 14 is employed to detect movement of the wristwatch type devices 10 and 10' and an image taken by the image sensor 14 is used as the basis, however, an infrared sensor, for example, may be employed as an image sensor 14 according to the purport of taking an image. An infrared sensor can take an image even in a dark environment.

Moreover, this image sensor 14 was provided in the display 12, however, it may be attached to other places such as the case 11 or attached belts 13A and 13B as long as an image can be taken for an imaging object.

Also, a heat-sensitive sensor can be used instead of an image sensor 14. The heat-sensitive sensor recognizes a user's face looking inside the display 12 as a heating element whose temperature is higher than the surrounding area, and detects movement of the heating element in the taken image when moving the wristwatch type devices 10 and 10'. A configuration similar to the above first and second embodiments could be implemented in this manner, as well.

Next, a third embodiment of the present invention will be described, a wristwatch type device, a method for controlling the device, and a method for moving a pointer. While in the above first and second embodiments, an image sensor 14 is employed to detect the movement of the wristwatch type devices 10 and 10', the third embodiment employs a strain sensor instead.

Figure 10:
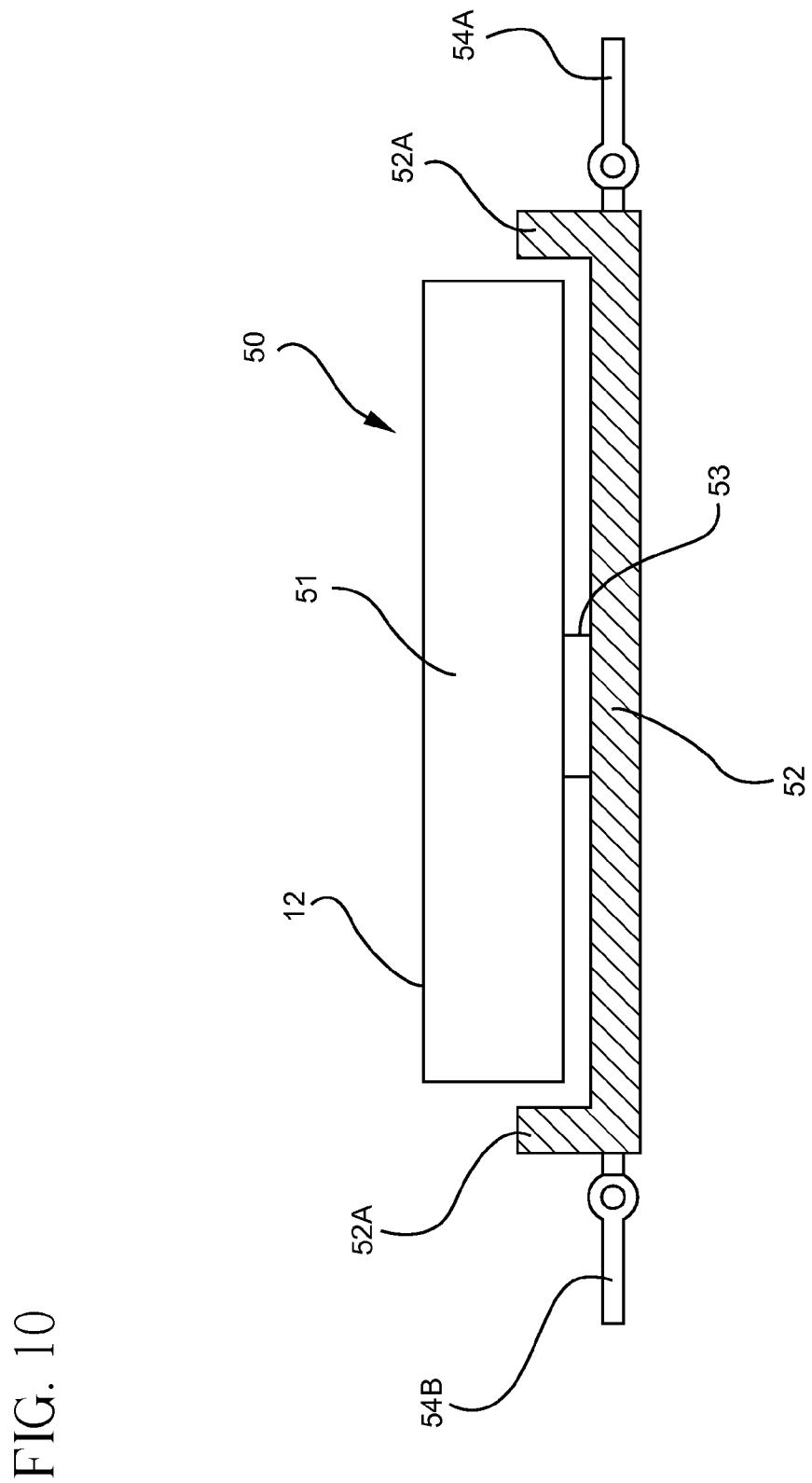
FIG. 10 is a sectional side elevation of the wristwatch type device according to the other embodiment of the present invention.

FIG. 10 is a sectional side elevation of the wristwatch type device 50 according to the embodiment, wherein this wristwatch type device 50 includes the body 51 with the display 12 provided on its surface, a base 52 that supports the body 51 with freedom within a plain along the display 12, a strain sensor (displacement detection means) 53 provided between the backside of the body 51 and the base 52, and attached belts 54A and 54B. A peripheral wall 52a upstanding toward the body 51 is formed on the periphery of the base 52, which regulates the movement of the body 51 relative to the base 52 within a predetermined distance.

This wristwatch type device 50 provides for a strain sensor 53 instead of an image sensor 14 of the wristwatch type devices 10 and 10' shown in the above first and second embodiments, wherein the strain sensor 53 senses the movement of the body 51 that can be moved relative to the base 52, and wherein a pointer P (see FIG. 1) or a cursor C (see FIG. 6) that are displayed in the display 12 is moved based on this movement. A method for moving the pointer P or the cursor C based on the sensed movement of the body 51 is not described here since the same method as the above first or second embodiment may be employed.

Alternatively, the strain sensor 53 may sense the vertical strain between the body 51 and the base 52 (i.e., the direction connecting the body 51 and the base 52) to recognize it as a click operation.

Such a wristwatch type device 50 may be attached to a user's wrist by an attached belt 54A and 54B. This fixes the base 52 to the user's wrist. When the user holds the body 51 with his fingers and moves the body 51 in a direction he wants to move the pointer P or the cursor C, if the body 51 provides for the touch sensor 15A and 15B (see FIG. 1) in the same positions as in the above first and second embodiments, the same operation method is applied as in the case of wristwatch type devices 10 and 10'. When the user moves the body 51, a relative displacement occurs between the body 51 and the base 52, which is sensed by the strain sensor 53. A motion vector of the body 51 is obtained based on the sensed displacement, whereby the pointer P and the cursor C are moved according to the motion vector.

As for the above-mentioned wristwatch type device 50, the same effects are achieved as in the above first and second embodiments.

While the strain sensor 53 is provided between the body 51 and the base 52 in the third embodiment, the base 52 may be removed in another configuration. That is, the strain sensor 53 is provided on the backside of the wristwatch type device 50, wherein the strain sensor 53 touches a user's wrist when he or she wears the wristwatch type device 50. According to this configuration, when a user moves the wristwatch type device 50, a relative displacement between the wrist and the body 51 is sensed by the strain sensor 53, thereby achieving the same effects as in the above third embodiment. It goes without saying that the attached belts 54A and 54B are attached to the body 51.

Alternatively, an acceleration sensor may be built in the wristwatch type device according to the purport that the wristwatch type device be moved to move the pointer P or the cursor C where the movement is detected.

Figure 11:
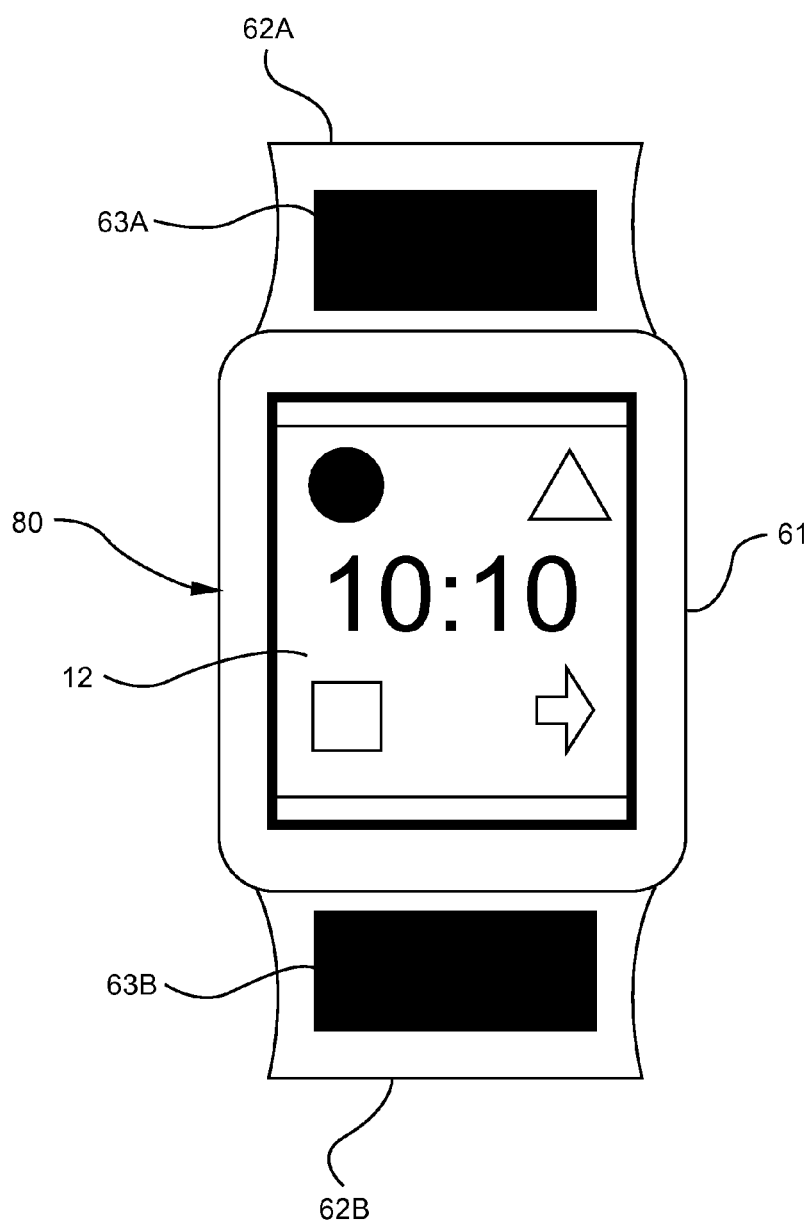
FIG. 11 shows a still further example of the wristwatch type device according to the present invention.

Further, in the sight of operation without touching the display device 12, touch sensors 63A and 63B may be provided around the display 12 on the attached belts 62A and 62B, which are attached to the upper and lower sides of the body 61 of the wristwatch type device 60, as shown in FIG. 11. In this case, the pointer P (see FIG. 1) or the cursor C (see FIG. 6) that is displayed in the display 12 is moved by these touch sensors 63A and 63B.

For example, the touch sensor 63A senses the movement of horizontal direction of the touched finger, while the touch sensor 63B senses the movement of vertical direction of the touched finger, wherein the pointer P and the cursor C are moved based on the sensed movements.

In such a wristwatch type device 60, an operation is performed using touch sensors 63A and 63B that are provided on the upper and lower sides of the display 12, thus the display 12 does not smear. In addition, as mechanical operative members are unnecessary, sufficient effects are brought about in the improvement of miniaturization and water proofing property as well as flexibility of design.

It is also possible to unite touch sensors 63A and 63B with the body and to attach the attached belts (not shown) there, whereby a user can change the attached belt to his or her taste.

While in the above embodiments icons 11 to 14 are displayed in the display 12, the number and location of icons as well as the kind and contents of applications activated are no object. Further, an operation menu or the like may be displayed as a character string instead of icons 11 to 14. Furthermore, when inputting characters in the display 12, for example, it is also possible to move a cursor that indicates the input position, using the above-mentioned configuration.

Further, while touch sensors 15A and 15B are provided to perform various operations in the above each embodiment, their installation locations and the quantity are variable and further alternative switches may be employed instead of touch sensors 15A and 15B. In this case, if any other switches that are provided for other uses are available, new switches do not need to be provided.

While so-called click operation has been performed by touching the touch sensors 15A and 15B when the pointer P or the cursor C is located on the icons 11 to 14, another operation method may be employed instead. For example, a predetermined operation may be detected by taking it with the image sensor 14. By way of example, while a user moves the wristwatch type device 10 or 10' near and apart from his face, this operation could be detected as a click operation from an image taken by the image sensor 14.

While a device has been shown as a wristwatch type in the above-mentioned embodiments, the present invention is applicable to various kinds of apparatuses such as a palmtop type portable information terminal, digital camera, cellular phone terminal, etc. For a so-called video phone that provides for a camera function among cellular phone terminals, the camera may be used as an image sensor.

The present invention may be applied to both the notebook type and desktop type personal computers. In such cases, it is hard to move the personal computer itself, thus the image sensor may be mounted in the monitor or the keyboard, wherein a pointer P and a cursor C similar to the above embodiments are operable by a user moving his hand in front of the image sensor, which takes an image of its movement. A personal computer like this is particularly useful for disabled persons.

As mentioned above, according to the present invention, flexibility of design is enhanced as well as various effects are achieved, including miniaturization of a device, improvement of water proofing property and operability, and stain proofing property of the display screen. In addition, power consumption can be restrained.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims.

The invention claimed is:

1. A wristwatch type device, comprising:
   a display for displaying a screen;
   a case for supporting the display;
   an attached belt attached to the case;
   a touch sensor mounted in the case or the attached belt for performing a predetermined operation on an object displayed on the screen, wherein the touch sensor is provided on both sides of the display; and
   an image sensor, wherein an image sensed by the image sensor is processed to obtain a displacement of the device itself.

2. The wristwatch type device according to claim 1, further comprising:
   displacement detection section for detecting a displacement of the display; and
   pointer position changing device for changing a display position of a pointer based on the detected results, thereby moving the pointer displayed on the screen.

3. The wristwatch type device according to claim 1, wherein the image sensor is located in a part of the display.

4. The wristwatch type device according to claim 1, wherein the image sensor has a minimum resolution of 36×36 dots.

* * * * *